US009727466B2

(12) United States Patent
Tune et al.

(10) Patent No.: US 9,727,466 B2
(45) Date of Patent: Aug. 8, 2017

(54) INTERCONNECT AND METHOD OF MANAGING A SNOOP FILTER FOR AN INTERCONNECT

(71) Applicant: ARM LIMITED, Cambridge (GB)

(72) Inventors: Andrew David Tune, Sheffield (GB); Sean James Salisbury, Sheffield (GB)

(73) Assignee: ARM Limited, Cambridge (GB)

( * ) Notice: Subject to any disclaimer, the term of this patent is extended or adjusted under 35 U.S.C. 154(b) by 38 days.

(21) Appl. No.: 14/822,953

(22) Filed: Aug. 11, 2015

(65) Prior Publication Data

US 2016/0062893 A1 Mar. 3, 2016

Related U.S. Application Data

(63) Continuation-in-part of application No. 14/468,536, filed on Aug. 26, 2014.

(30) Foreign Application Priority Data

Jan. 12, 2015 (GB) .................................. 1500451.8

(51) Int. Cl.
*G06F 12/08* (2016.01)
*G06F 12/0831* (2016.01)
*G06F 12/0808* (2016.01)

(52) U.S. Cl.
CPC ...... *G06F 12/0833* (2013.01); *G06F 12/0808* (2013.01); *G06F 12/0831* (2013.01);
(Continued)

(58) Field of Classification Search
CPC ............. G06F 12/0831; G06F 12/0833; G06F 12/0808; G06F 2212/62; G06F 12/0815; G06F 2212/621; Y02B 60/1225
See application file for complete search history.

(56) References Cited

U.S. PATENT DOCUMENTS 6,810,467 B1 * 10/2004 Khare ................. G06F 12/0822
711/140
7,698,509 B1 4/2010 Koster et al.
(Continued)

OTHER PUBLICATIONS

Office Action mailed Feb. 16, 2016 in co-pending U.S. Appl. No. 14/468,536, 36 pages.
(Continued)

*Primary Examiner* — Hashem Farrokh
(74) *Attorney, Agent, or Firm* — Nixon & Vanderhye P.C.

(57) ABSTRACT

An interconnect and method of managing a snoop filter within such an interconnect are provided. The interconnect is used to connect a plurality of devices, including a plurality of master devices where one or more of the master devices has an associated cache storage. The interconnect comprises coherency control circuitry to perform coherency control operations for data access transactions received by the interconnect from the master devices. In performing those operations, the coherency control circuitry has access to snoop filter circuitry that maintains address-dependent caching indication data, and is responsive to a data access transaction specifying a target address to produce snoop control data providing an indication of which master devices have cached data for the target address in their associated cache storage. The coherency control circuitry then responds to the snoop control data by issuing a snoop transaction to each master device indicated by the snoop control data, in order to cause a snoop operation to be performed in their associated cache storage in order to generate snoop response data. Analysis circuitry then determines from the snoop response data an update condition, and upon detection of the update condition triggers performance of an update operation within the snoop filter circuitry to update the address-dependent caching indication data. By subjecting the snoop response data to such an analysis, it is possible to identify
(Continued)

situations where the caching indication data has become out of date, and update that caching indication data accordingly, this giving rise to significant performance benefits in the operation of the interconnect.

19 Claims, 10 Drawing Sheets

(52) U.S. Cl.
CPC .... *G06F 2212/62* (2013.01); *G06F 2212/621* (2013.01); *Y02B 60/1225* (2013.01)

(56) References Cited

U.S. PATENT DOCUMENTS

| | | | |
|---|---|---|---|
| 2003/0005237 A1 | 1/2003 | Dhong et al. | |
| 2004/0003184 A1 | 1/2004 | Safranek et al. | |
| 2004/0186963 A1 | 9/2004 | Dieffenderfer et al. | |
| 2006/0224836 A1* | 10/2006 | Blumrich | G06F 12/0822 711/146 |
| 2007/0233965 A1 | 10/2007 | Cheng et al. | |
| 2008/0005485 A1* | 1/2008 | Gilbert | G06F 12/0833 711/146 |
| 2008/0109565 A1 | 5/2008 | Ajanovic | |
| 2008/0147986 A1* | 6/2008 | Chinthamani | G06F 12/0831 711/141 |
| 2008/0209133 A1 | 8/2008 | Ozer et al. | |
| 2009/0300289 A1 | 12/2009 | Kurts et al. | |
| 2013/0318308 A1 | 11/2013 | Jayasimha et al. | |
| 2014/0095806 A1 | 4/2014 | Fajardo et al. | |
| 2014/0189254 A1 | 7/2014 | Pardo et al. | |
| 2014/0281190 A1 | 9/2014 | Kaushikkar | |
| 2015/0052309 A1 | 2/2015 | Philip | |
| 2015/0302193 A1 | 10/2015 | Sara | |

OTHER PUBLICATIONS

Office Action mailed Feb. 16, 2016 in co-pending U.S. Appl. No. 14/640,599, 35 pages.
U.S. Appl. No. 14/640,599, filed Mar. 6, 2015, Aug. 24, 2014, Salisbury et al.
U.S. Appl. No. 14/468,536, filed Aug. 24, 2014, Salisbury et al.
Agarwal et al., "In-Network Snoop Ordering (INSO): Snoopy Coherence on Unordered Interconnects", Department of Electrical Engineering, Princeton University, No Date, 12 pgs.
ARM, CoreLink, Introduction to AMBA® 4 ACE™ and big. LITTLE™ Processing Technology, Jun. 6, 2011, 15 pages.
Ghosh et al., "Way Guard: A Segmented Counting Bloom Filter Approach to Reducing Energy for Set-Associative Caches", *ISPLED '09*, Aug. 19-21, 2009, pp. 165-170.
Moshovos et al., "Jetty: Filtering Snoops for Reduced Energy Consumption in SMP Servers", *University of Toronto—Electrical and Computer Engineering*, Jan. 2001, 12 pages.
Ranganathan et al., "Counting Stream Registers: an Efficient and Effective Snoop Filter Architecture", Jul. 2012, 8 pages.
Salapura et al., "Design and Implementation of the Blue Gene/P Snoop Filter", *IEEE* 2008, 10 pages.
Strauss et al., "Flexible Snooping: Adaptive Forwarding and Filtering of Snoops in Embedded-Ring Microprocessors", *Computer Architecture*, 2006, 12 pages.
UK Search Report issued Jun. 29, 2015 in GB 1500451.8, 4 pages.
Final Office Action mailed Aug. 23, 2016 in co-pending U.S. Appl. No. 14/468,536, 39 pages.

* cited by examiner

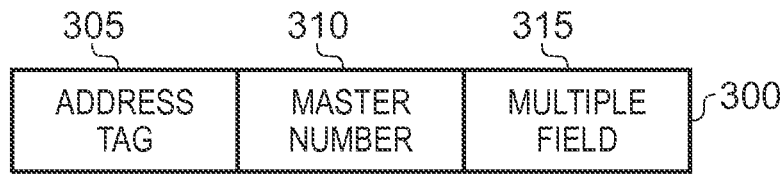

IF MULTIPLE FIELD SET, SNOOP ALL CACHES
IF MULTIPLE FIELD CLEAR, SNOOP CACHE FOR
MASTER NUMBER IDENTIFIED

COMPARE / UPDATE BASED ON SNOOP RESPONSE

1) SNOOP VECTOR INDICATES ONE / MULTIPLE
    SNOOP RESPONSE INDICATES NO HITS

ACTION: INVALIDATE SNOOP FILTER ENTRY

2) SNOOP VECTOR INDICATES MANY
    SNOOP RESPONSE INDICATES ONE HIT

ACTION: CLEAR MULTIPLE FIELD, AND UPDATE
            MASTER NUMBER IF REQUIRED

FIG. 8

INTERCONNECT AND METHOD OF MANAGING A SNOOP FILTER FOR AN INTERCONNECT

This application is a continuation-in-part of U.S. application Ser. No. 14/468,536 filed Aug. 26, 2014 and claims priority to GB Patent Application No. 1500451.8 filed Jan. 12, 2015, the entire contents of each of which are hereby incorporated by reference.

BACKGROUND

Field

The present technique relates to the field of interconnects, and to a method of managing a snoop filter within such an interconnect.

An interconnect may be used to interconnect a plurality of devices, for example in an integrated circuit, and to maintain coherency between the devices. When one device issues a data access transaction for a target address, other devices may have cached copies of the data from the target address, so to maintain coherency the interconnect can send snoop transactions to other devices to check the status of the cached copies at other devices, for example to identify the most up to date data value for the target address. Whilst in one known arrangement coherency control circuitry within the interconnect can be arranged to issue snoop transactions to all master devices that are capable of storing cached copies of the data, in an alternative arrangement it is known for the coherency control circuitry to use a snoop filter in order to seek to reduce the number of snoop transactions required. In particular, a snoop filter may record which master devices have cached data for various addresses. By only sending snoop transactions to the master devices recorded in the snoop filter for a given address, the number of snoop transactions can be reduced.

However, whilst the use of the snoop filter can significantly reduce the number of snoop transactions that would otherwise be required, it is necessary for the contents of the snoop filter to be kept up to date in order to ensure that the snoop filter operates efficiently. Whilst it is often the case that cache coherency protocols will require each master device to notify the coherency control circuitry when it allocates data into its associated cache and when it evicts data from its associated cache, some modern cache coherency protocols allow at least certain eviction actions to be taken without communicating those actions to the rest of the coherent system.

In such a scenario, it is possible for the contents of the snoop filter to become out of date (also referred to herein as "stale"), which can lead to some snoop transactions being issued unnecessarily, thereby reducing efficiency and increasing energy consumption.

Further, the number of entries in the snoop filter will typically be quite limited. If at the time a cacheable address is being considered by the coherency control circuitry, all of the entries in the snoop filter are actually allocated to other addresses, then it is typically necessary to select an entry in the snoop filter to be back invalidated in order to allow that snoop filter entry to then be allocated to the current cacheable address. However, the back invalidate operation requires forcibly removing from all of the various caches the cached data associated with the address currently being tracked by the selected entry in the snoop filter, which can take a significant time and consume significant energy. The above issue of entries potentially becoming stale can result in certain snoop filter entries not being freed up for allocation to other addresses when they should, and hence can increase the number of back invalidate operations required. This can significantly affect system performance if the back-invalidated entry is not the stale entry.

SUMMARY

In one example arrangement, there is provided an interconnect for connecting devices, the devices including a plurality of master devices, one or more of the master devices having associated cache storage, the interconnect comprising: coherency control circuitry to perform coherency control operations for data access transactions received by the interconnect from the master devices; snoop filter circuitry to maintain address-dependent caching indication data and, responsive to a data access transaction specifying a target address, to produce snoop control data providing an indication of which master devices have cached data for the target address in their associated cache storage; the coherency control circuitry being responsive to said snoop control data to issue a snoop transaction to each master device indicated by the snoop control data, in order to cause a snoop operation to be performed in their associated cache storage in order to generate snoop response data; and analysis circuitry to determine from the snoop response data an update condition, and upon detection of said update condition to trigger performance of an update operation within the snoop filter circuitry to update the address-dependent caching indication data.

In another example arrangement, there is provided a method of managing a snoop filter for an interconnect connecting devices, the devices including a plurality of master devices, one or more of the master devices having associated cache storage, the method comprising: performing coherency control operations for data access transactions received by the interconnect from the master devices; maintaining within a snoop filter address-dependent caching indication data; responsive to a data access transaction specifying a target address, deriving from the caching indication data snoop control data providing an indication of which master devices have cached data for the target address in their associated cache storage; responsive to said snoop control data, issuing a snoop transaction to each master device indicated by the snoop control data, in order to cause a snoop operation to be performed in their associated cache storage in order to generate snoop response data; and determining from the snoop response data an update condition, and upon detection of said update condition triggering performance of an update operation within the snoop filter to update the address-dependent caching indication data.

In a yet further example arrangement, there is provided an interconnect for connecting devices, the devices including a plurality of master devices, one or more of the master devices having associated cache storage, the interconnect comprising: coherency control means for performing coherency control operations for data access transactions received by the interconnect from the master devices; snoop filter means for maintaining address-dependent caching indication data and, responsive to a data access transaction specifying a target address, for producing snoop control data providing an indication of which master devices have cached data for the target address in their associated cache storage; the coherency control means, in response to said snoop control data, for issuing a snoop transaction to each master device indicated by the snoop control data, in order to cause a snoop operation to be performed in their associated cache storage in order to generate snoop response data; and analysis means for determining from the snoop response data an update condition, and upon detection of said update condition, for triggering performance of an update operation within the snoop filter means to update the address-dependent caching indication data.

BRIEF DESCRIPTION OF THE DRAWINGS

The present technique will be described further, by way of example only, with reference to embodiments thereof as illustrated in the accompanying drawings, in which:

FIG. 8 illustrates an alternative configuration of caching indication data that can be stored within each entry of the snoop filter in accordance with one embodiment, and illustrates update actions that can be taken in respect of that caching indication data dependent on the snoop response;

DESCRIPTION OF EMBODIMENTS

Figure 1:
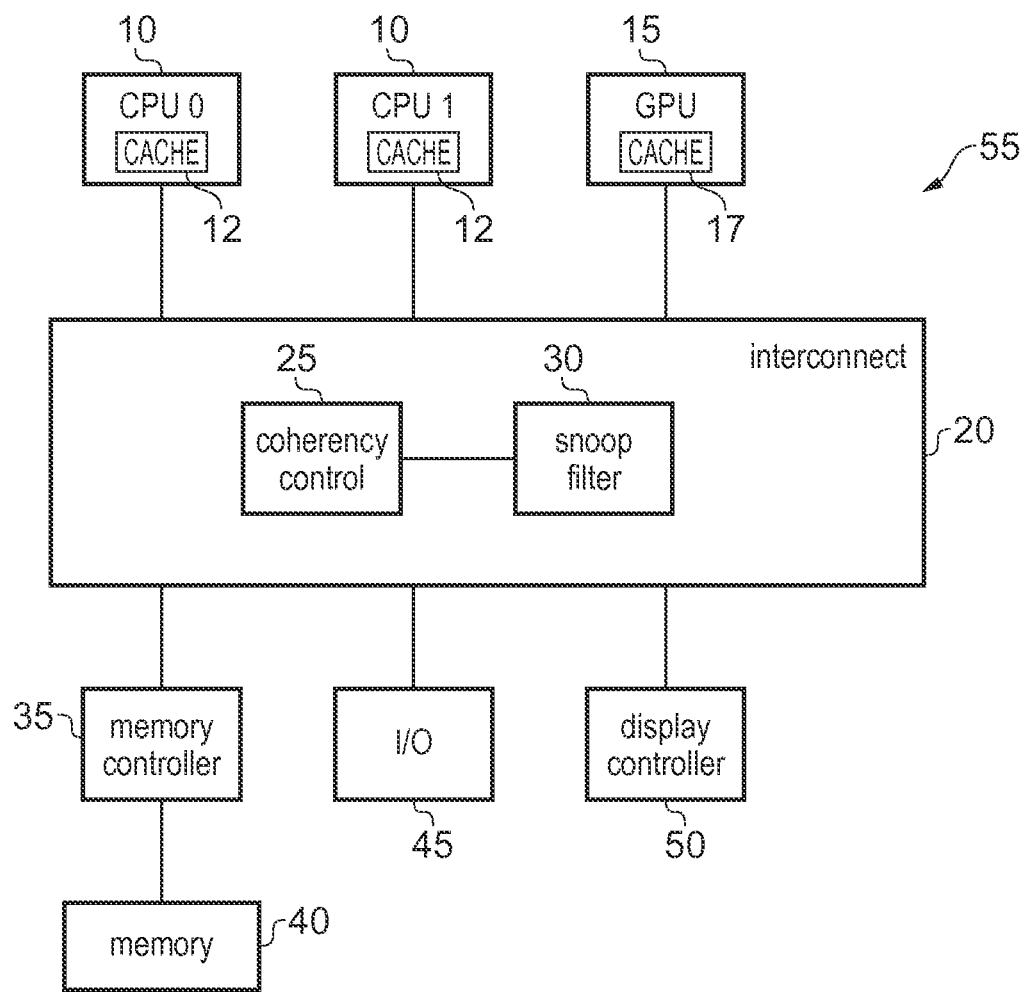
FIG. 1 schematically illustrates an integrated circuit having an interconnect for maintaining coherency between devices, in accordance with one embodiment.

Before discussing the embodiments with reference to the accompanying figures, the following description of embodiments is provided.

In accordance with one example embodiment, an interconnect is used to connect a plurality of master devices and a plurality of slave devices, in one embodiment the various master devices, slave devices and the interconnect being provided within an integrated circuit. One or more of the master devices has associated cache storage, and the interconnect comprises coherency control circuitry to perform coherency control operations for data access transactions received by the interconnect from the master devices, in order to ensure that the most up to date data is accessed, taking into account any cached data. For a target address specified by a data access transaction, caching indication data maintained by snoop filter circuitry is referenced in order to produce snoop control data providing an indication of which master devices have cached data for the target address in their associated cache storage. As a result, the coherency control circuitry issues a snoop transaction to each master device indicated by the snoop control data, which results in a snoop operation being performed within the relevant cache storage in order to generate snoop response data. Analysis circuitry is then arranged to determine from the snoop response data a situation where the snoop filter circuitry's caching indication data appears to be out of date, and upon detection of such a condition triggers performance of an update operation within the snoop filter circuitry to update the address-dependent caching indication data.

The invention recognises that, due to the earlier-mentioned issue of the content of the snoop filter becoming stale, the "indication" of which master devices have cached data for the target address as provided by the snoop control data may include some inaccuracies. However, by adopting the approach outlined above, in addition to using the snoop response data to control the subsequent handling of the data access transaction that caused the one or more snoop transactions to be issued, the snoop response data is also analysed in order to detect situations where the snoop control data produced by the snoop filter circuitry is inconsistent with the snoop response data. On detecting such a situation, the caching indication data maintained within the snoop filter circuitry can be updated accordingly. By such an approach, it is possible to significantly reduce the possibility of the caching indication data becoming stale, and this can hence give rise to significant performance improvements and reduced energy consumption within the system containing the interconnect. In particular, whilst the caching indication data can temporarily become stale by virtue of a master device not advising the coherency control circuitry of certain actions it undertakes in respect of the cached data (for example by not informing the coherency control circuitry when it performs at least one type of eviction in respect of the cached data), the above technique avoids that stale information accumulating and causing performance issues. In particular, when such stale information is used in order to trigger one or more snoop transactions, the presence of the stale information can be detected by analysis of the associated snoop response data, and the caching indication data can then be updated to update/remove the stale information. This can significantly reduce the number of back invalidate operations that might otherwise be required.

Further, in certain embodiments where the snoop filter maintains counters for particular memory regions indicative of the number of allocations of cached data within that memory region to a cache, the use of the technique can significantly reduce the prospect of a counter overflowing due to non-communication to the snoop filter of evictions within the memory region. If a counter did overflow, it would typically be necessary to invalidate the relevant entry within the snoop filter, and when the entry is tracking memory regions this can give rise to a large amount of snoop bandwidth being consumed in order to invalidate all of the required cache entries. Hence, by performing analysis of the snoop response data, in order to detect when data has become stale, and correcting the caching indication data within the snoop filter accordingly, this can give rise to significant performance benefits within the system.

In one embodiment, the snoop filter circuitry is arranged to maintain the address-dependent caching indication data in response to cache allocation information and cache eviction information issued by the plurality of master devices. However, in one embodiment, at least one of the master devices is arranged to perform at least one type of cache eviction operation in respect of its associated cache storage without passing corresponding cache eviction information to the coherency control circuitry. Hence, this "silent" eviction (from the coherency control circuitry's point of view) can give rise to certain of the caching indication data within the snoop filter circuitry becoming stale, since the snoop filter circuitry will still consider a master device to have the cached data when that data has been previously allocated to the master device's cache, and the snoop filter circuitry has not received any notification of that cached data being evicted. However, as discussed earlier, whenever that stale information is used to initiate snoop transactions, the corresponding snoop response data that is subsequently received can then be analysed by the analysis circuitry in order to detect that the caching indication data includes stale information, and to update the caching indication data accordingly.

The snoop filter circuitry can take a variety of forms but in one embodiment comprises a snoop filter storage having a plurality of entries, each entry arranged to store an address identifier and the caching indication data for that address identifier. In one embodiment the address identifier may identify a unique address, in which case the caching indication data may indicate which master devices have cached data for that unique address. However, alternatively the address identifier may identify an address range, in which instance the caching indication data may indicate which master devices have cached data within that address range.

There are a number of ways in which the analysis circuitry may determine the presence of the update condition. In one embodiment, the analysis circuitry determines the update condition by detecting a situation where the snoop response data identifies that the associated cache storage of at least one master device no longer stores cached data for the target address, and the snoop control data for that target address indicates that said at least one master device did store the cached data. The snoop circuitry is then arranged to perform the update operation triggered by the update condition in order to update the address-dependent caching indication data for the entry whose address identifier corresponds to the target address. Hence, in one embodiment the information encoded in the snoop response data can be used to determine the appropriate updates to be performed in the address-dependent caching indication data.

In one embodiment, if the snoop response data identifies that the cached data for the target address is no longer stored in the associated cache storage of any of said master devices, the snoop circuitry is arranged to perform the update operation in order to invalidate the corresponding entry in the snoop filter storage. Hence, by such an approach, this can avoid entries continuing to be allocated in the snoop filter storage, even when none of the caches are still caching data for the identified address. Instead, through use of the analysis circuitry, such a situation can be identified, and the relevant entry can be invalidated, hence freeing that entry for subsequent allocation in respect of a new target address. This can significantly reduce the number of back invalidate operations that might otherwise be required.

There are a number of ways in which the analysis circuitry can compare the snoop control data with the corresponding snoop response data. In one embodiment, the analysis circuitry is arranged to detect the update condition by comparing a first vector derived from the snoop control data with a second vector derived from the snoop response data, both the first and second vectors having a field for each of the master devices, with each field being set or unset dependent on whether the snoop control data or snoop response data identifies the associated master device as storing the cached data in its associated cache storage.

Whilst the snoop control data and the associated snoop response data can take a variety of forms, and the first and second vectors can be derived from the snoop control data and the snoop response data, respectively, in one embodiment the snoop control data and the snoop response data directly provide the first and second vectors, and accordingly those vectors can be compared directly without requiring any further derivation from the snoop control data and the snoop response data.

In one embodiment, the caching indication data in each entry of the snoop filter storage takes the form of a snoop vector identifying for each master device whether that master device has cached data associated with that address identifier, and the snoop filter circuitry is arranged, on detection of the update condition in a situation where the second vector identifies at least one master device as still storing the cached data for the target address, to perform the update operation in order to update the snoop vector for the entry whose address identifier corresponds to the target address to match the second vector. Hence, in such an embodiment, the snoop vector can effectively merely be updated to match the second vector.

Whilst the caching indication data can in one embodiment take the form of a snoop vector, in an alternative embodiment the caching indication data may include a master identifier field identifying a master device, and a multiple field identifying whether one master device or multiple master devices store the cached data. If an entry in the snoop filter storage associated with the target address has the multiple field unset, the coherency control circuitry may be arranged to issue a snoop transaction only to the master device identified in the master identifier field. However, alternatively, if the entry associated with the target address has the multiple field set, the coherency control circuitry may be arranged to issue a snoop transaction to all of the master devices. It will be appreciated that there are a number of ways in which the set and unset states can be identified within each entry of the snoop filter storage. Hence, for example, whilst in one embodiment a set state may be indicated by a logic one value and an unset state by a logic zero value, in an alternative embodiment a set state may be indicated by a logic zero value and an unset state indicated by a logic one value.

In one embodiment, in a situation where the multiple field is set, and accordingly a snoop transaction is issued to all of the master devices, the analysis circuitry is arranged to detect the update condition when the snoop response data indicates that only one master device still stores the cached data in its associated cache storage. The snoop filter circuitry is then responsive to the update condition to unset the multiple field in the corresponding entry of the snoop filter to identify that one master device stores the cached data, and to update the master identifier field to identify the one master device indicated by the snoop response data as still storing the cached data. Hence, this provides a simple and effective mechanism for detecting situations where the information within the entry of the snoop filter circuitry has become stale to an extent where the snoop filter storage indicates that multiple master devices store the cached data, where in fact only one master device still stores the cached data.

Further, if the snoop response data indicates that the cached data is no longer stored in any cache storage devices associated with the master devices, then the relevant entry in the snoop filter storage can be invalidated, thereby freeing up that entry for subsequent use in association with another address identifier.

In one embodiment where the address identifier identifies an address range, then the caching indication data may take the form of a counter value for each master device indicating the number of allocations into the associated cache structure of cached data within that address range. Such an approach can be used to reduce the snoop filter size, by only needing to keep separate entries for different address ranges.

In one such embodiment, the snoop filter circuitry is arranged to adjust in a first direction the counter value for a master device each time the coherency control circuitry is advised that that master device has made a further allocation of cached data within that address range into its associated cache structure, and to adjust in a second direction the counter value for a master device each time the coherency control circuitry is advised that that master device has performed an eviction of cached data within that address range from its associated cache structure. In one embodiment, the snoop filter may be arranged to increment the counter value on an allocation and to decrement the counter value on an eviction, whilst in an alternative embodiment the snoop filter may be arranged to decrement the counter value on an allocation and to increment the counter value on an eviction.

However, it will be appreciated that the counter values can become out of date (stale) if not all of the activities of the master device with respect to its cached data are notified to the snoop filter circuitry. In particular, if one or more types of eviction are not so notified, then, considering by way of example the increment on allocation embodiment, the counter values can increase beyond the value that is truly representative of the number of allocations into the associated cache structure of cached data within the tracked addressed range. As discussed earlier, this may have the potential over time that a counter value overflows, which then requires the corresponding entry to be invalidated, at which point all of the cached data within that address range needs to be back invalidated within the various caches, consuming significant snoop bandwidth. Also, it can give rise to a situation where, for a particular entry that might otherwise be able to be invalidated, since none of the caches still store cached data within the tracked address range, one or more of the counter values are still non-zero, and accordingly that entry is not invalidated. This again can give rise to an increase in the number of back invalidate operations required, for example if a new target address is issued in respect of a data access transaction, and none of the current entries in the filter storage are tracking an address range which incorporates that target address.

In one embodiment, this problem is alleviated through use of the snoop response data being analysed by the analysis circuitry. In particular, in one embodiment, the snoop response data provides a further counter value for each master device identifying a number of cached entries in the associated cache storage currently storing cached data within the address range, and the analysis circuitry is arranged to determine the update condition by detecting a situation where, for at least one of the master devices, the further counter value provided by the snoop response data differs from the counter value provided by the caching indication data.

In such an arrangement, the master devices that are subjected to the snoop transactions need to be able to produce, as part of the snoop response, counter values indicative of the number of cached entries in their associated cache storage currently storing cached data within the specified address range. In some embodiments, this can be readily achieved since the lookup circuits used in association with the cache storage may involve an initial stage based on an address range lookup, where again counter values are maintained in association with the address ranges. Hence, if the initial lookup identifies a non-zero counter value, then the lookup can pass to a second stage where a lookup is performed in respect of the specific target address, whereas if the initial lookup results in a zero counter value, then this will indicate that the cached data is not stored within the cache and the second stage lookup is not required. The information obtained from that initial lookup stage can be used to provide the necessary further counter values provided within the snoop response data.

In one such embodiment, the snoop circuitry is arranged to perform the update operation triggered by the update condition in order to update, for said at least one of the master devices, the counter value with the further counter value. Hence, in such embodiments the further counter values can be directly used to determine the appropriate updates required within the relevant entry of the snoop filter circuitry.

Particular embodiments will now be described with reference to the figures.

FIG. 1 schematically illustrates a data processing apparatus 55 having a number of devices connected to an interconnect 20, the devices in this example including one or more processors (CPUs) 10, a graphics processor (GPU) 15, a memory controller 35 for controlling access to a memory 40, an input/output device 45 for communicating with a peripheral or external device such as an Ethernet interface for example, and a display controller 50 for controlling display of data on a display device. It will be appreciated that many other types of devices could be connected to the interconnect 20. Typically, the devices may include master devices (such as a CPU 10 or GPU 15) which can initiate data access transactions, and slave devices (such as the memory controller 35 or I/O device 45) which may service the transactions. Some devices may be able to function both as a master device and as a slave device.

The devices are connected to the interconnect 20 which manages communication between the devices. Some of the devices may have a local cache for storing cached versions of data from the memory 40. In the example shown in FIG. 1, it is assumed that each of the CPUs 10 has an associated cache 12, and the GPU 15 also has an associated cache 17, but in other embodiments not all of the master devices will have associated local cache structures. More than one device may cache data from the same address and so the interconnect 20 is arranged to maintain coherency within the system. Indeed, whenever one or more of the master devices has an associated local cache structure, it will typically be necessary for the interconnect to perform coherency control operations to ensure that the various devices connected to the interconnect will always see the most up-to-date version of any particular data item. The interconnect 20 has coherency control circuitry 25 for performing the required coherency control operations for transactions issued by the devices, and a snoop filter 30 for tracking which devices are understood to hold cached copies of data. In particular, for the purposes of the present application, from the snoop filter's perspective, a cache is assumed to "have" or "hold" data when that data has been previously allocated to the cache and not externally indicated as having been evicted, and the snoop filter will produce an indication of which master devices "have" cached data based on that assumption.

The coherency control circuitry 25 may perform various coherency management operations, including for example hazard detection for detecting when multiple transactions target the same address, ordering enforcement for ensuring that transactions targeting the same address are handled in a known and predictable order to maintain coherency, and arbitration operations for selecting which of several pending transactions to the same address should be serviced when. Various coherency protocols may be used to ensure coherency. An example is the ARM® AMBA® ACE protocol provided by ARM® Limited of Cambridge, UK.

Whilst in the example of FIG. 1 the various master devices connected to the interconnect are individual processing units, in an alternative embodiment one or more of the master devices may effectively be a subsystem, consisting of multiple individual processing units which may for example have access to a shared cache structure. Hence, purely by way of example, if two CPUs are arranged to have access to a shared cache structure, those two CPUs and associated shared cache may collectively form a subsystem which is viewed by the interconnect as a connected master device.

As will be discussed later with reference to FIGS. 6 to 10, the snoop filter can be constructed in a variety of ways, but typically comprises a plurality of entries, with each entry arranged to store an address identifier and caching indication data for that address identifier. The address identifier may identify a unique address in memory, or can specify an address range. When a master device issues a data access transaction specifying a target address within a cacheable address region of memory, then the coherency control circuitry 25 will perform a lookup within the snoop filter 30 in order to determine whether the snoop filter has an entry with an address identifier that maps onto the target address, and if so the caching indication data of that entry is used to produce snoop control data returned to the coherency control circuitry, and used to determine which master devices to issue snoop transactions to in order to perform snoop operations in their associated cache storage.

Performance of such snoop operations within the cache structures of the master devices will result in the generation of snoop response data being returned to the coherency control circuitry. This is then used to control the further handling of the data access transaction. For example, if the data access transaction is a read transaction, and the required read data is identified in one of the snooped cache structures, then the read data can be returned directly from the snooped cache rather than requiring further access to memory 40 in order to retrieve the required data. As will be appreciated, other coherency actions may also be undertaken. For example, in the above case of a read transaction, the snooped cache may mark its copy of the data as invalid, or may still retain the cached copy, but mark it as shared.

As will be discussed in more detail later, the snoop response data is also used to detect situations where the contents of the snoop filter have become stale. In particular, in one embodiment it is possible for one or more of the master devices to perform certain types of eviction operation in respect of their associated cache structures without reporting that activity back to the coherency control circuitry, and this can lead to one or more of the snoop filter entries having caching indication data that is out of date. By using the snoop response data to detect such situations, it is possible to then update the relevant caching indication data in order to remove the stale information, which as mentioned earlier can significantly increase performance, for example by reducing the number of back invalidate operations required.

Figure 2:
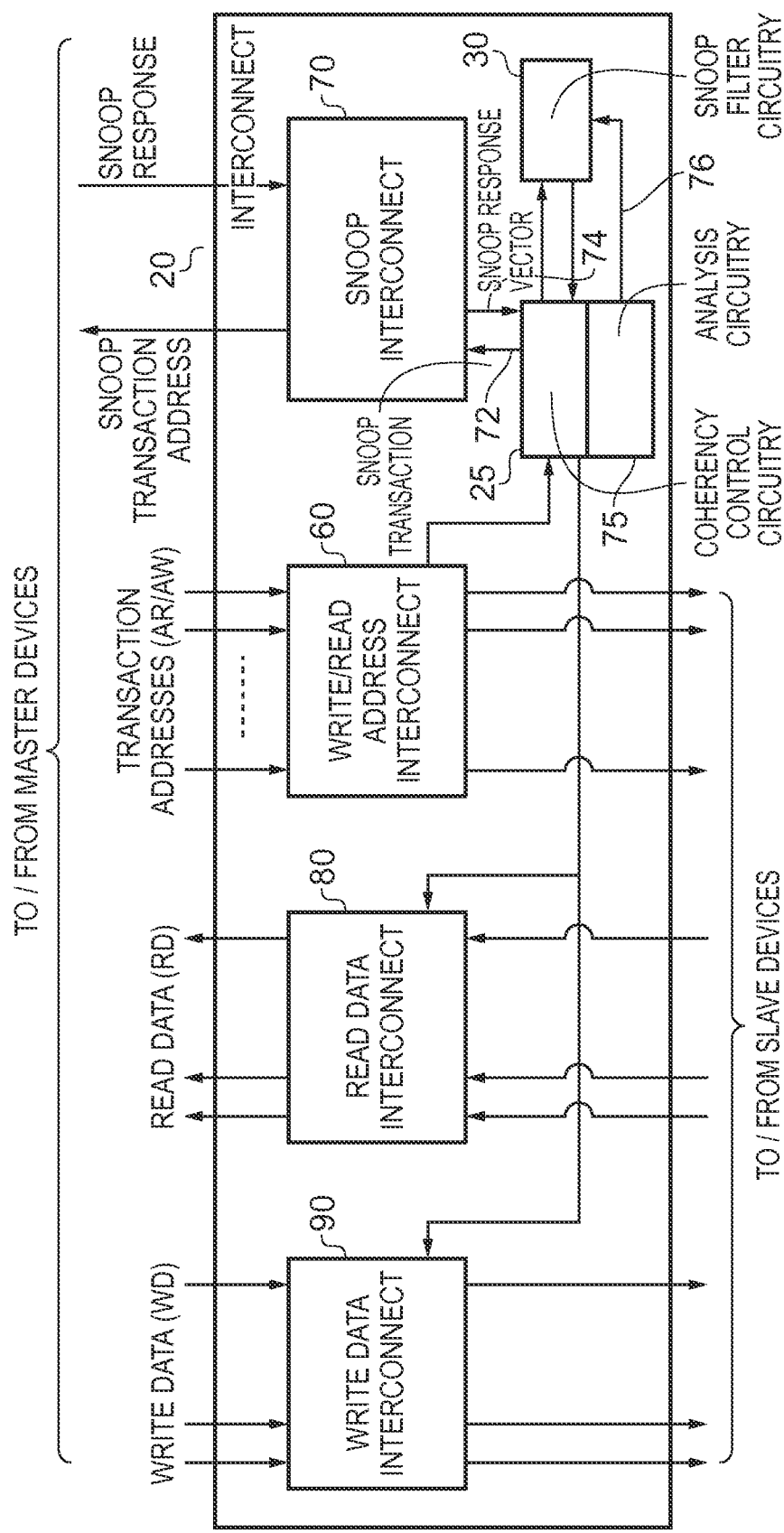
FIG. 2 is a block diagram illustrating in more detail components that may be provided within the interconnect in accordance with one embodiment.

FIG. 2 is a block diagram illustrating various components provided within the interconnect 20 in accordance with one embodiment. Each data access transaction issued by a master device will typically involve an address transfer followed by one or more data transfers. As shown in FIG. 2, separate interconnect structures can be provided within the interconnect 20 to handle the routing of the various address and data traffic of such data access transactions. In particular, a write/read address interconnect 60 may be provided for managing the routing through the interconnect 20 of the various address transfers of both read and write transactions. Further, a read data interconnect 80 may be used to control the routing of read data returned from slave devices to master devices during the processing of read transactions, and write data interconnect 90 may be provided for controlling the routing of write data traffic from master devices to slave devices during the performance of write transactions. As also shown in FIG. 2, a snoop interconnect 70 may be provided for handling snoop transactions issued from the coherency control circuitry to various master devices, in order to perform snoop operations within the master devices' associated cache structures, and for handling the resultant snoop response information returned from those master devices.

As shown in FIG. 2, information about address transfers of data access transactions is passed from the read/write address interconnect to the coherency control circuitry 25. For any coherent transactions, for example those specifying a target address within a cacheable region of memory, the coherency control circuitry 25 is arranged to perform various coherency control operations as discussed earlier. As part of this process, it will typically access the snoop filter circuitry 30 in order to determine whether the snoop filter currently has an entry for the specified target address of the transaction. If it does, then the caching indication data maintained within that snoop filter's entry will be used to produce snoop control data returned to the coherency control circuitry. The snoop control data is used by the coherency control circuitry to identify which of the master devices should be subjected to a snoop transaction, and thereafter the required snoop transactions are issued over path 72 into the snoop interconnect 70 for onward routing to the relevant master devices.

On receipt of a snoop transaction, a master device will initiate a lookup within its associated cache structure in order to determine whether it currently holds data for the address specified in the snoop transaction, which in one embodiment will be the target address specified by the corresponding data access transaction. This results in a snoop response being issued back to the snoop interconnect 70 identifying whether the cache structure does or does not hold cached data for that address. In some embodiments, in the event that the cached structure does hold such cached data, the cached data will also be returned as part of the snoop response.

In one embodiment, the snoop interconnect 70 is arranged to collate the various snoop responses from the snooped master devices, and to provide a consolidated snoop response vector over path 74 to the coherency control circuitry 25. Based on this information, the coherency control circuitry can then control the further steps required to process the associated data access transaction. This may involve sending various control signals to the read data interconnect 80 and/or the write data interconnect 90.

In addition to the above steps performed in order to implement the required coherency control operations, analysis circuitry 75 is also provided (either as part of the coherency control circuitry 25, or in association therewith) to perform some additional analysis on the snoop response vector 74 returned from the snoop interconnect 70. In particular, by comparing that snoop response vector with the original snoop control data obtained by the coherency control circuitry 25 from the snoop filter circuitry 30, it can be determined whether the relevant contents in the snoop filter circuitry have become stale, and if so an update operation can be triggered over path 76 in order to cause the relevant caching indication data within the snoop filter circuitry to be updated. This prevents the accumulation of stale information within the snoop filter circuitry, which can significantly improve performance within the interconnect. In particular, in addition to reducing the number of unnecessary snoop transactions issued, it also reduces the prospects of the snoop filter becoming full, i.e. having all of its available entries allocated for particular addresses, since when it can be determined for a particular allocated entry that none of the caches still hold cached data for the address being tracked, then that entry can be invalidated freeing it up for use in connection with a target address specified by a subsequent data access transaction.

Figure 3:
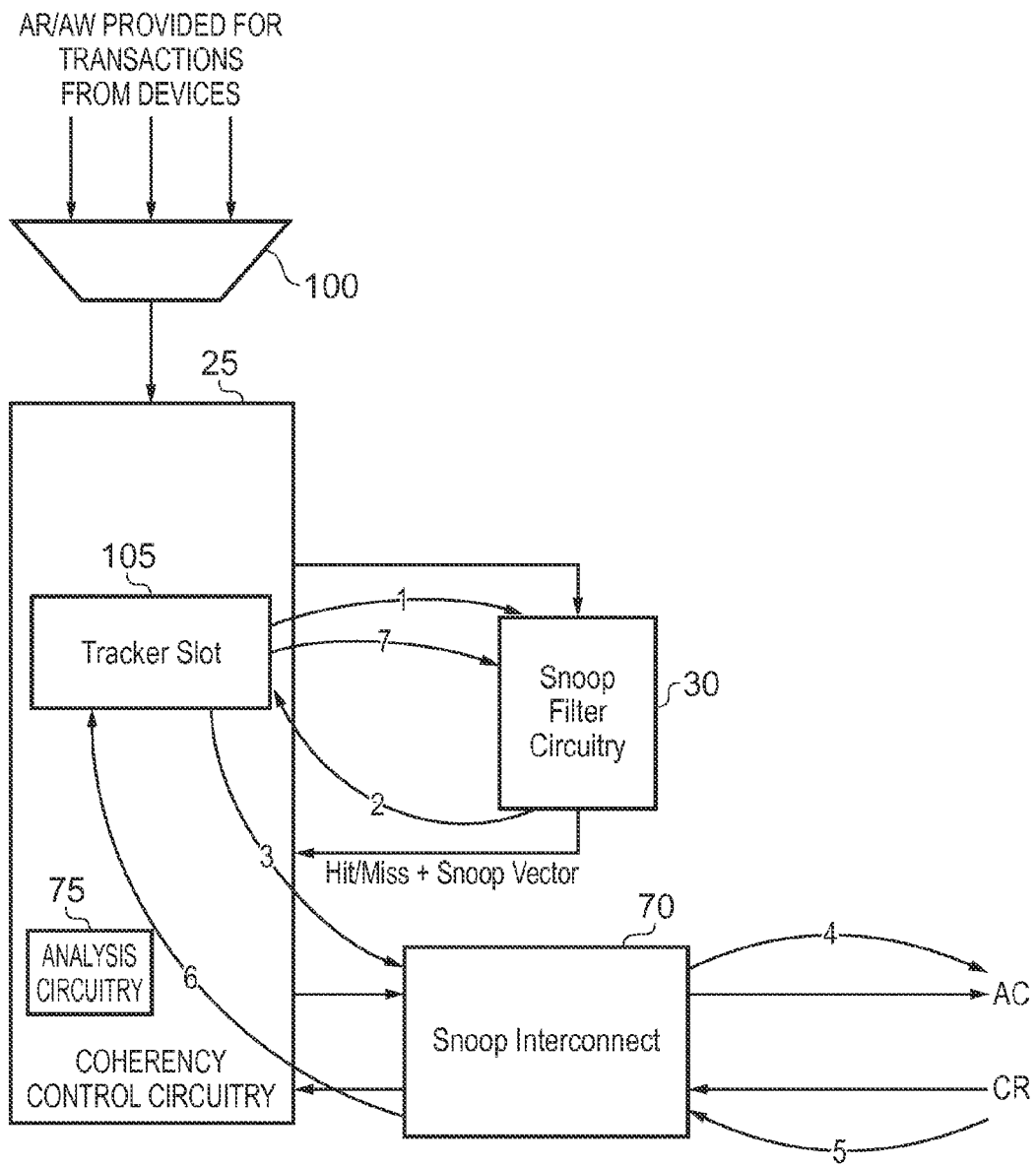
FIG. 3 is a diagram schematically illustrating a sequence of steps undertaken when performing a snoop operation in accordance with one embodiment.

FIG. 3 schematically illustrates a sequence of events that take place upon receipt of an address transfer by the coherency control circuitry 25. In particular, the various address transfers received by the interconnect are subject to an arbitration operation by the arbiter 100 in order to determine the order in which those address transfers should be routed to the coherency control circuitry 25. The coherency control circuitry 25 maintains a tracker slot 105 for each pending transaction that it is processing, and the steps described hereafter may be performed independently for each of the transactions being tracked in an associated tracker slot 105.

As indicated by the arrow 1, an initial lookup is performed in the snoop filter circuitry 30 which results in snoop control data being returned over path 2 to the coherency control circuitry. In the event of a hit within an entry of the snoop filter circuitry, the snoop control data will identify one or more master devices which have an associated cache structure that the snoop filter circuitry indicates still stores cached data for the target address of the data access transaction being tracked in the tracker slot 105. In one embodiment, this information is provided as a snoop vector identifying for each master device that has an associated cache structure, whether that associated cache structure is believed to still hold cached data for the target address.

Based on the snoop vector, the coherency control circuitry generates and issues the required snoop transactions, which are routed over path 3 to the snoop interconnect 70, and then over path 4 to the required master devices. In due course, the various snoop responses will be returned over path 5 from the master devices to the snoop interconnect, which will then collate the various snoop responses and issue a consolidated snoop response over path 6 back to the coherency control circuitry 25. If a snooped cache no longer holds cached data for the target address, this will be indicated in the snoop response. Based on the consolidated snoop response, the coherency control circuitry 25 can then determine what further actions are required to process the data access transaction, and as will be understood this will cause the coherency control circuitry to issue one or more control signals to other components within the interconnect to control the onward performance of the write or read operations specified by the data access transaction. In addition, the analysis circuitry 75 will compare the consolidated snoop response data with the initial snoop control data received over path 2 from the snoop filter circuitry in order to detect situations indicating that the contents of the snoop filter circuitry are out of date. In one embodiment where both the snoop response data and the snoop control data take the form of snoop vectors, this may merely involve comparing whether the snoop response vector is different from the initial snoop vector obtained from the snoop filter circuitry. If a situation is detected where the snoop filter's contents are considered to be out of date, then an update operation can be issued over path 7 to the snoop filter circuitry 30 to cause the relevant entry in the snoop filter to be updated.

If a situation is detected where the snoop response data indicates that none of the caches still store cached data for the target address, then the update operation issued over path 7 may actually cause the relevant entry in the snoop filter circuitry 30 to be invalidated. Alternatively, if there are still some master devices whose associated cache structures still hold the cached data for the target address, then the entry only needs to be updated to identify those master devices that do no longer store the cached data. Typically no further action will be required, as the relevant master device will already have evicted the data from its cache, as indicated by the snoop response data.

As the above analysis and update process is performed in parallel with the processing of the actual transaction that initiated the snoop lookup, this does not result in any extension of the transaction's occupancy within the tracker slot 105, and hence the process can be performed without any reduction in transaction throughput through the interconnect.

By updating the snoop filter in the above manner, this corrects any mis-tracking of stale entries, giving rise to more effective snoop filter occupation, and a reduction in false snoops, thereby saving power and snoop interconnect/cache bandwidth. As will be discussed later, it can also facilitate easier use of area saving snoop filter structures such as Bloom/JETTY filters.

Figure 4:
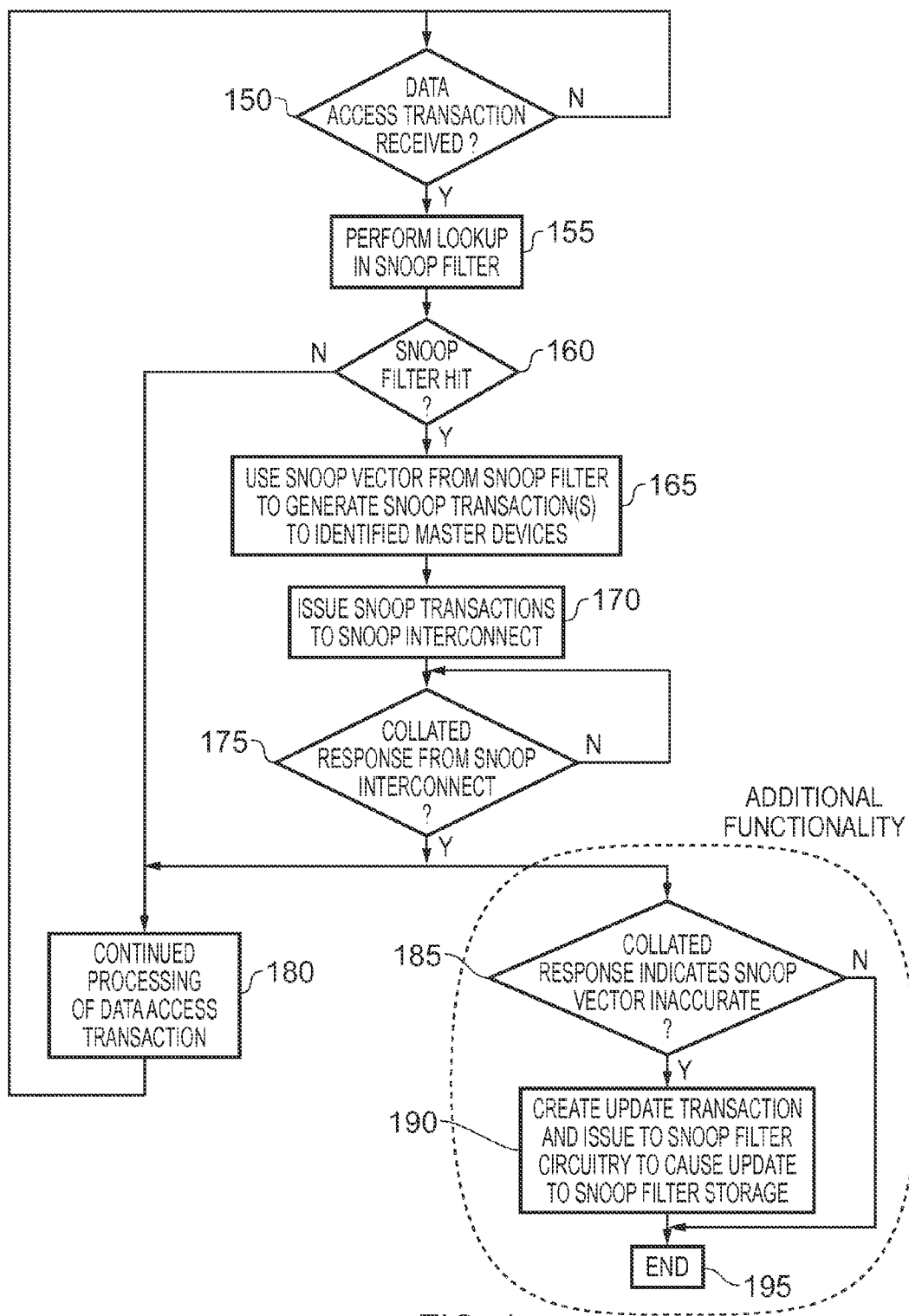
FIG. 4 is a flow diagram illustrating steps performed by the coherency control circuitry and associated analysis circuitry in accordance with one embodiment.

FIG. 4 is a flow diagram further illustrating the steps performed within the coherency control circuitry upon receipt of a data access transaction. When a data access transaction is received into the one of the tracker slots 105 at step 150, then a lookup is performed in the snoop filter 30 at step 155, whereafter it is determined at step 160 whether there has been a snoop filter hit. If not, the process proceeds directly to step 180, where continued processing of the data access transaction is performed in the standard manner, on the understanding that the required data is not cached in any of the cache structures associated with the master devices.

If at step 160 a snoop filter hit is detected, then the snoop vector returned as part of the snoop control data is then used at step 165 to generate snoop transactions to each master device identified in the snoop vector as having cached data for the target address. Those snoop transactions are issued at step 170 to the snoop interconnect, from where they are forwarded on to the master devices.

Thereafter, at step 175, the coherency control circuitry 25 awaits a collated snoop response from the snoop interconnect 70, and when that is received the process then proceeds to step 180 where continued processing of the data access transaction is performed based on the information returned as part of the snoop response.

In addition, the extra steps indicated by steps 185, 190 are performed using the snoop response information. In particular, at step 185, it is determined by the analysis circuitry 75 whether the collated snoop response indicates that the initial snoop vector retrieved from the snoop filter circuitry is inaccurate. If not, then no further steps are required, and the process ends at step 195. However, if such an inaccuracy is detected, then an update transaction is created within the coherency control circuitry and issued to the snoop filter circuitry in order to cause an update to be performed in the relevant entry of the snoop filter. This update will cause the stale information to be removed from the relevant snoop filter entry, thereby avoiding the accumulation of stale information within the snoop filter entry. Further, as mentioned earlier, in situations where it is determined that none of the master devices still have cached data for the target address in their associated caches, then the relevant entry in the snoop filter can be invalidated, freeing up space in the snoop filter for subsequent allocations. Thereafter, the process ends at step 195.

Figure 5:
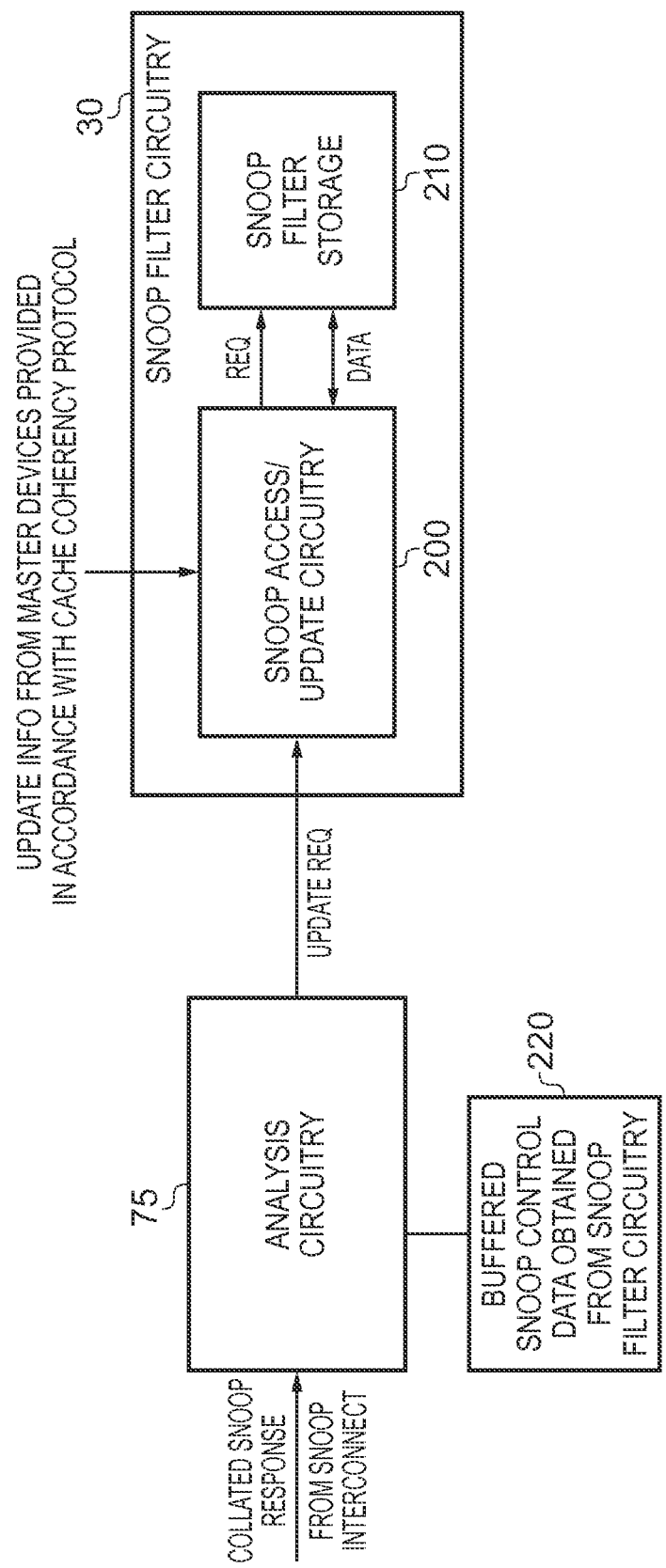
FIG. 5 illustrates in more detail the interaction between the analysis circuitry and the snoop filter circuitry in accordance with one embodiment.

FIG. 5 illustrates more details of the snoop filter circuitry 30. In particular, the snoop filter circuitry will include snoop filter storage 210, and associated snoop access/update circuitry 200 for performing lookup operations within the snoop filter storage in order to retrieve information used to produce the snoop control data returned to the coherency control circuitry, and for writing data into the snoop filter storage based for example on update information received from the master devices in accordance with the cache coherency protocol. Hence, during normal operation the master devices may typically issue cache allocation information and cache eviction information to the snoop access/update circuitry 200, in order to enable the snoop filter storage to be updated to track which master devices currently hold cached data for particular target addresses. However, as mentioned earlier, in accordance with some cache coherency protocols, there are certain types of activities which the master devices are not required to inform the coherency control circuitry of, and accordingly for which no update information is received by the snoop access/update circuitry 200. In particular, one or more types of eviction are allowed to be performed by a master device without the coherency control circuitry being informed. Whilst this does not impact correct performance of the coherency control operations, in embodiments where a snoop filter is used it can lead to the build up of stale information within the snoop filter storage 210, as discussed earlier.

As shown in FIG. 5, the analysis circuitry 75 is arranged to analyse the collated snoop response from the snoop interconnect 70 and the snoop control data obtained from the snoop filter circuitry (which may be held in a buffer 220 for subsequent use when the associated collated snoop response is subsequently returned), in order to detect situations where stale information resides within the snoop filter storage. Upon detection of such a situation, it issues an update request to the snoop access/update circuitry 200 to cause an update operation to be performed within the snoop filter storage in order to update the relevant entry so as to remove the stale information.

Figure 6:
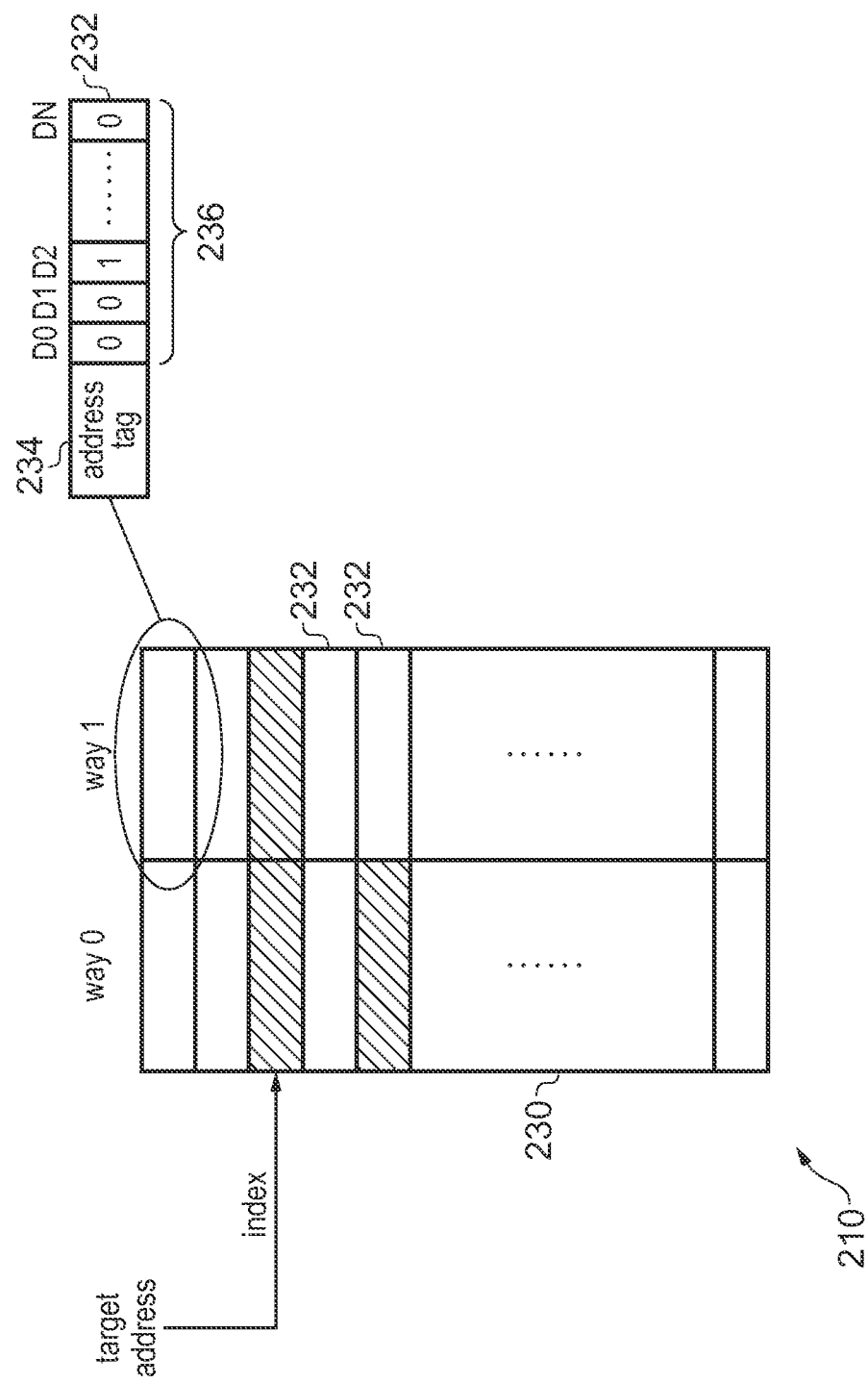
FIG. 6 shows one example arrangement of a snoop filter for determining which devices have cached data corresponding to a target address, in accordance with one embodiment.

As mentioned earlier, the snoop filter storage can be arranged in a variety of ways. FIG. 6 shows an example of part of the snoop filter storage 210 in accordance with one embodiment. The snoop filter 210 has a data store 230 having a number of entries 232. In this example, the data store 230 has a set-associative structure, so that the entry for a given target address can only be stored in one of a limited set of locations indexed based on the address. In the example of FIG. 6, the associativity is 2, so there are two entries available for storing any one address. It will be appreciated that the data store could have a greater associativity than 2, or that a direct mapped or fully-associative structure could be used instead of a set-associative structure. Each snoop filter entry 232 holds an address tag 234 identifying the part of the corresponding address which was not used to index into the entry 232, and a set of device indicating bits 236 (referred to herein as a snoop vector). Each bit 236 corresponds to one of the devices 10, 15 which could hold cached data and indicates whether or not that device currently has valid cached data for that address. Not all the devices need to have a corresponding indicator bit 236 as some devices may not have a cache. Optionally, in some cases each snoop filter entry 232 may also include other information, such as coherency status information indicating for example whether the cached data is shared or unique, or clean or dirty. While FIG. 6 shows an example with a single bank of snoop filter entries, in some cases multiple snoop filter banks may be provided which can be looked up in parallel.

In response to a data access transaction specifying a target address, the coherency control circuitry 25 looks up the target address in the snoop filter 210 to determine which devices are understood to hold cached data for the address. Hence, the target address is input to the snoop filter 210, which uses an index portion of the address to select the corresponding set of entries 232. The snoop filter 210 then compares the tag portions of each entry within that set against the tag portion of the target address, to determine whether they match. If there is a tag match (i.e. a snoop filter hit), then a hit signal is returned to the coherency control circuitry 25 together which the indicator bits 236 of the entry whose tag 234 matched the target address. The coherency control circuitry 25 initiates snoop transactions to the devices indicated by the indicator bits 236 as holding cached data. This allows the number of snoop transactions to be filtered so that it is not necessary to send snoop transactions to devices which do not have the data. When responses to the snoop transactions are received from the devices, the snoop filter 210 is updated based on the snoop responses, based on the analysis performed by the analysis circuitry 75. For example, if a device has evicted its copy of the data then the snoop filter may be updated to indicate that the device no longer has the cached data.

In some examples, the snoop filter 210 may be an inclusive snoop filter which means that the snoop filter 210 contains a record of all data that is cached by the devices. Hence, whenever some data is allocated to the cache of one of the devices, the snoop filter is updated accordingly. However, as mentioned earlier, the snoop filter may allow some inaccuracy concerning invalidations from the local caches of the devices, as some of the devices may not always inform the interconnect 20 when data is invalidated from its cache, and so sometimes the snoop filter 210 may still indicate that the device has the cached data, when actually it no longer has it. Hence, occasionally there may be some additional snoop transactions generated which are sent to devices which do not actually have the cached data. In response to such snoop transactions, the device responds indicating that it does not have the data, and then the snoop filter can be updated so that on a following transaction to the same address, that device will no longer be snooped.

If in response to a given transaction, the snoop filter 210 is looked up and there is no corresponding entry 232 for the target address of the transaction, then a new entry can be allocated by the snoop filter 210. For example, each entry may have a valid bit (not shown in FIG. 6) which indicates whether the entry is valid, and on allocating a new entry, an entry in the set corresponding to the target address having the valid bit cleared may be selected.

However, if all the entries in the set are already taken, then the snoop filter may evict an entry and allocate that entry for the new address. The victim entry may be selected using any known victim selection technique. For example, a least recently used (LRU) or pseudo least recently used policy may be useful, since generally the least recently used data value is less likely to be used again in future than more recently accessed data values.

As mentioned earlier, when a victim entry has to be selected, this can give rise to a significant performance and bandwidth impact, since when using an inclusive snoop filter it will then be necessary for any of the master devices indicated in that victim entry as storing cached data for the address tracked by that victim entry to be forced to evict the data from their caches. By using the earlier described snoop filter update mechanism in order to avoid the build up of stale information within the snoop filter, this can significantly reduce the occurrences with which victim entries need to be selected, since it is more likely that snoop filter entries will be invalidated when the master devices are no longer caching data at the address being tracked by those entries.

Figure 7:
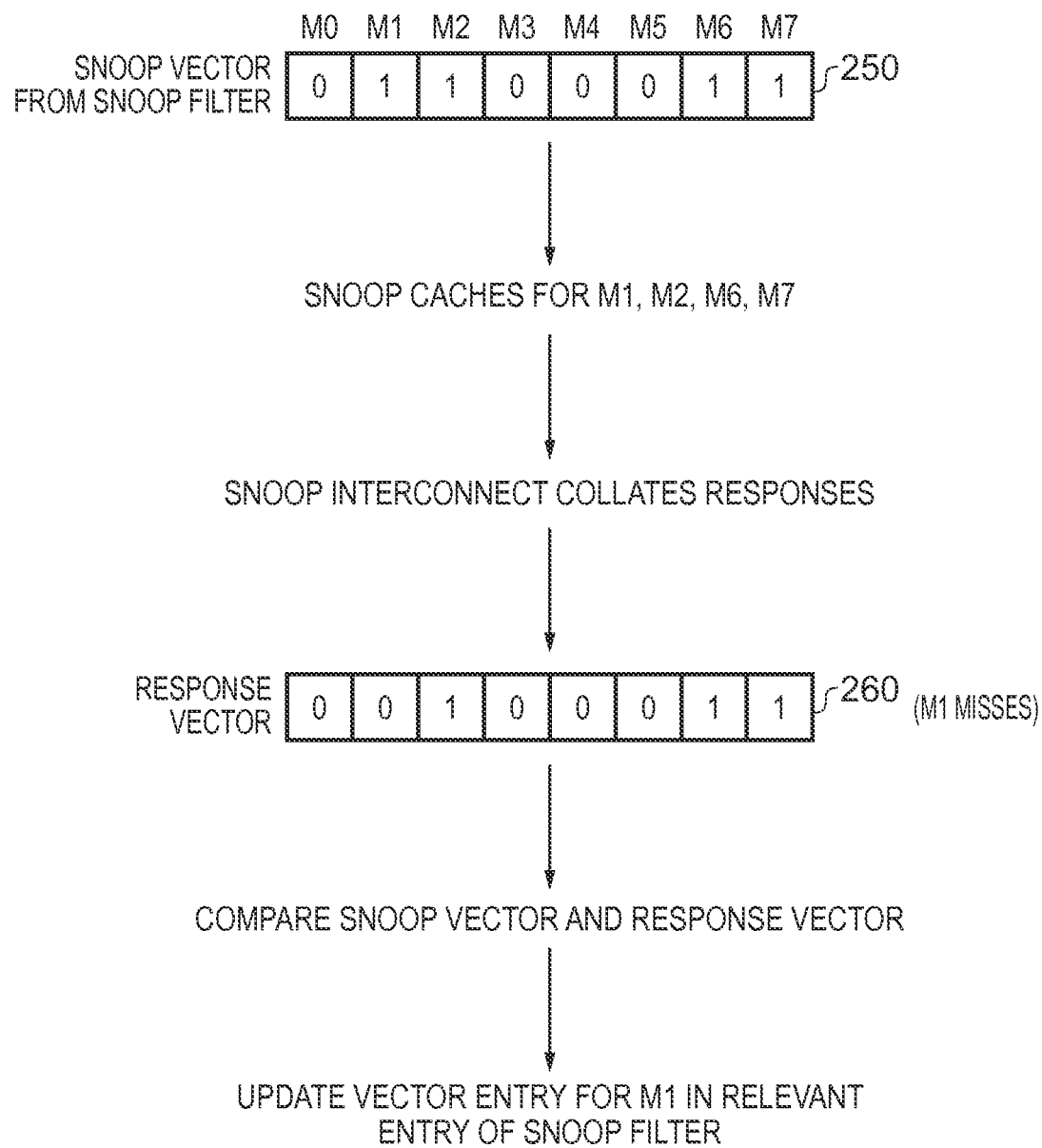
FIG. 7 illustrates how a snoop vector obtained from the snoop filter and a response vector obtained from the snoop interconnect are used in order to determine when an update is required to the snoop filter contents in accordance with one embodiment.

FIG. 7 schematically illustrates the update operation for a particular example scenario. In this example scenario, it is assumed that the snoop vector returned from the snoop filter circuitry 30 following the initial lookup takes the form 250 shown in FIG. 7. Here, a logic one value indicates that the corresponding master device is believed to still hold cached data for the tracked address, whilst a logic zero value indicates that the corresponding master does not store cached data for that tracked address. Accordingly, as a result of the snoop vector 250, snoop transactions are issued to snoop the caches for master devices M1, M2, M6 and M7. When the snoop interconnect subsequently collates the snoop responses, this results in the response vector 260 being received by the coherency control circuitry 25. In this particular example, it is assumed that the response vector still indicates that master devices M2, M6 and M7 store cached data for the target address, but it is assumed in this example scenario that the snoop response vector indicates that master device M1 no longer stores cached data for that target address. This is detected by the analysis circuitry comparing the snoop vector and the response vector, and as a result of detecting that situation, the analysis circuitry causes an update transaction to be issued to the snoop filter circuitry in order to update the vector entry for master device 1 in the relevant entry of the snoop filter. In one embodiment, this can be achieved merely by overwriting the snoop vector held in the snoop filter circuitry's entry with the response vector.

FIG. 8 illustrates an alternative format of caching indication data that may be held within each entry of the snoop filter circuitry. In this embodiment, each entry 300 again includes an address tag 305, but the associated caching indication data contains the two fields 310, 315. In particular, the master number field 310 identifies a particular master device, and the multiple field 315 is set or unset to identify whether all caches should be snooped, or only the cache associated with the master device identified by the master number field 310. Snoop control data is derived from this caching indication data 310, 315, so that if the multiple field is set, the caches associated with all of the master devices are snooped, whereas if the multiple field is unset, then only a single snoop transaction is issued to the master device identified by the master number in the field 310. This can be an efficient encoding in situations where in many cases it is expected that cached data will not be shared, and accordingly will only reside in a single cache.

If the snoop vector retrieved from the snoop filter circuitry identifies either that a single master device should be snooped, or that all master devices should be snooped, but the snoop response subsequently indicates that the cached data is not found in the snooped master devices, then the analysis circuitry 75 can issue an update transaction to the snoop filter circuitry to cause the corresponding entry in the snoop filter to be invalidated. Further, if the snoop vector originally obtained from the snoop filter circuitry indicated that all master devices needed to be snooped, but the snoop response indicates in fact that only one of the master devices is currently caching data at the target address, then again the analysis circuitry can issue an update transaction to the snoop filter circuitry, in this instance the update transaction causing the multiple field in the relevant entry to be unset, and if necessary causing the master number field 310 to be updated to correctly identify the single master device that is currently caching data at the target address.

Figure 9:
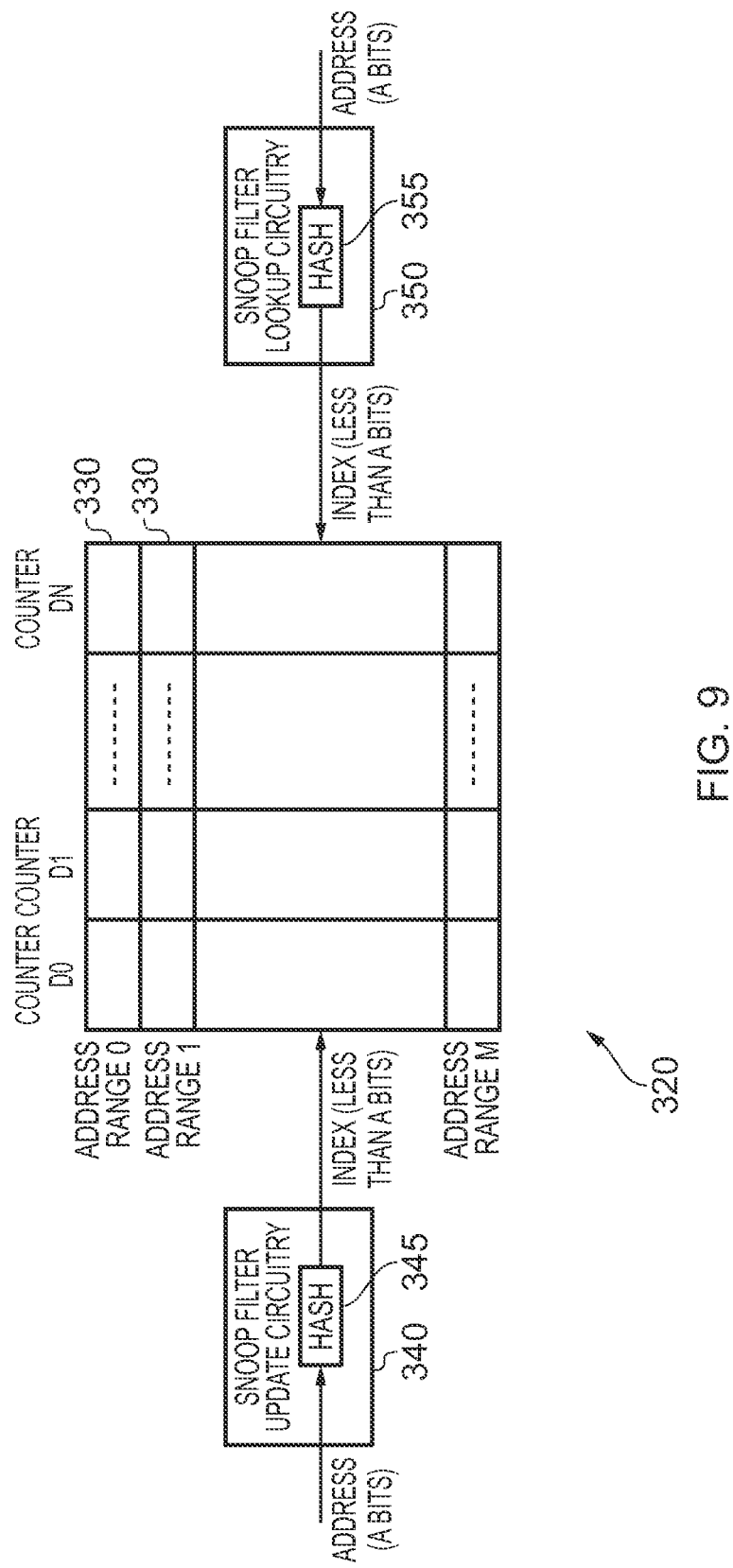
FIG. 9 illustrates a snoop filter arrangement in accordance with an alternative embodiment.

FIG. 9 illustrates an alternative arrangement of snoop filter storage and associated lookup and update circuitry. In this embodiment, each entry in the snoop filter is associated an address range. The address range may be a contiguous range of addresses, or may in fact relate to a set of discontiguous addresses that are identified by a particular hash function. In this example the caching indication data 330 again contains a separate piece of information for each master device, but in this instance the information takes the form of a counter. In particular, each time the coherency control circuitry is advised that a master device has made a further allocation of cached data within the address range into its associated cache structure, then the snoop filter update circuitry 340 receives the corresponding address, and subjects that address to a hash function 345 in order to generate an index into the relevant entry of the snoop storage. Once the relevant entry has been identified, then the counter value for the relevant master device is incremented. Similarly, whenever the coherency control circuitry is advised that a master device has performed an eviction of cached data within that address range from its associated cache structure, then the snoop filter update circuitry 340 is again used to identify the relevant entry, and to perform a decrement of the counter for the relevant master device. Hence, in such embodiments, it will be appreciated that a zero value counter indicates that the corresponding master has not cached data within the corresponding address range, whilst a non-zero value indicates that the master device has cached data within the associated address range.

When performing a lookup operation, the snoop filter lookup circuitry 350 can take a target address of a data access transaction, and subject it to a hash function 355 (this will typically be the same hash function as the hash function 345) in order to identify an entry within the snoop filter. The relevant counter values within that entry are then used to determine which master devices should be snooped.

It will be appreciated that in such an embodiment it is still possible for stale information to accumulate within the snoop filter. In particular, if the snoop filter is not advised of one or more evictions performed by a master device, then the counter values will not be decremented correctly, which means that they will not return to a zero value when data within the address range is no longer being cached by the associated master device. However, the earlier described mechanism performed by the analysis circuitry can still be used to seek to remove such stale information in such embodiments. This is illustrated schematically by the example of FIG. 10.

Figure 10:
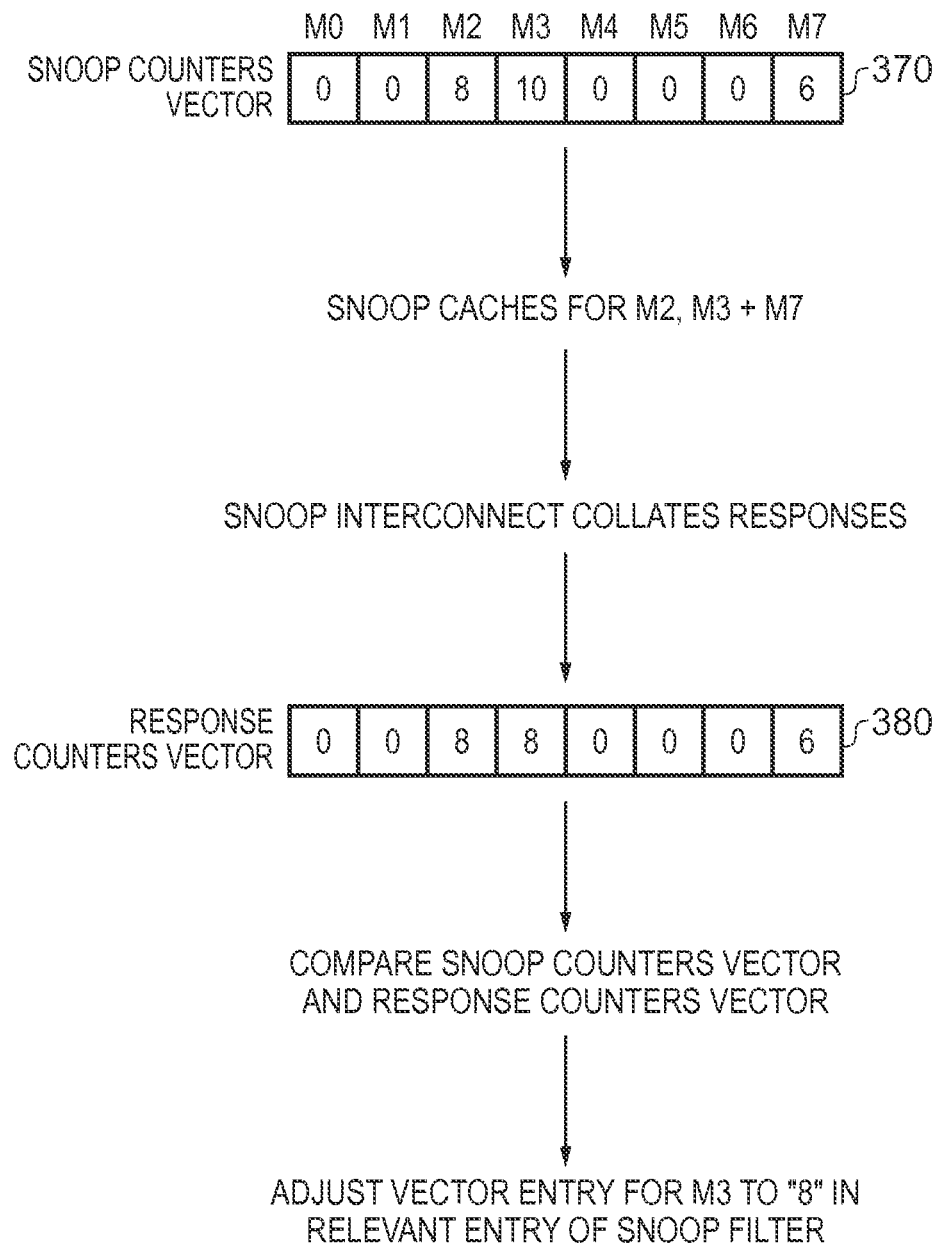
FIG. 10 illustrates how the snoop counters within such an embodiment may be updated dependent on response counter information provided in the snoop response in accordance with one embodiment.

As shown in FIG. 10, the snoop counters vector 370 obtained from the snoop filter as part of the initial lookup operation has the form shown in FIG. 10. This has particular non-zero count values for masters M2, M3 and M7, and accordingly snoop transactions are issued to the caches of those three master devices. The snoop interconnect then collates the responses back from the various master devices. In this embodiment, it is assumed that the master devices are able to use the lookup circuitry provided for their associated cache structures in order to determine the number of data values cached within the particular address range associated with the entry in the snoop filter, in addition to being able to determine whether they actually cache the cached data of the target address of the data access transaction. Whilst this may involve additional lookups to be performed in some embodiments, over and above the lookup required to determine whether the cache has cached data for the target address of the data access transaction, in some embodiments this additional level of lookup can be readily performed where the cache lookup structures adopt a multi-level approach. For example, in some cache structures, an initial lookup in a fast lookup structure can be performed based on address ranges in order to identify whether the cache does or does not cache data within those ranges, and then only if that initial lookup indicates that the cache does cache data within the address range is a further lookup performed to identify whether the cache does in fact store cached data for a particular target address within that address range. In such embodiments, where the address range granularity specified in the lookup circuitry of the cache corresponds with the address range granularity used in the snoop filter, then the results of that initial lookup can be used to construct the response counter vector 380 returned from the snoop interconnect.

In this example, a comparison of the response counters vector with the initial snoop counters vector identifies that the counter values are different in respect of master device M3, and accordingly an update operation can then be initiated via the snoop filter update circuitry 340 in order to update the relevant vector entry for master device M3 in the identified entry of the snoop vector in order to update the count value for that master device to "8". Hence, again the accumulation of stale information within the snoop filter can be avoided.

There are a number of ways of arranging a snoop filter to use the counter structures shown in FIG. 9, and hence for example such a snoop filter can be arranged as a Bloom filter or a JETTY filter. By using the update mechanism described, this makes it easier to use such area saving snoop filters, since it reduces the risk that the counters will overflow. If the counters do overflow, then it will be necessary to invalidate the entry within the snoop filter, and as a result it would be necessary to evict from the caches of the various devices any cached data within the entire address range associated with that snoop filter entry, which would require a large amount of snoop bandwidth within the interconnect and caches, and would also incur a large power overhead. Accordingly, by reducing the prospect that stale information will cause such counters to overflow, this can give rise to significant performance benefits within the interconnect.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An interconnect for connecting devices, the devices including a plurality of master devices, one or more of the master devices having associated cache storage, the interconnect comprising:
coherency control circuitry to perform coherency control operations for data access transactions received by the interconnect from the master devices;
snoop filter circuitry to maintain address-dependent caching indication data and, responsive to a data access transaction specifying a target address, to produce snoop control data providing an indication of which master devices have cached data for the target address in their associated cache storage;
the coherency control circuitry being responsive to said snoop control data to issue a snoop transaction to each master device indicated by the snoop control data, in order to cause a snoop operation to be performed in their associated cache storage in order to generate snoop response data; and
analysis circuitry to determine from the snoop response data an update condition where there is an inconsistency between the snoop response data and the snoop control data, and upon detection of said update condition to trigger performance of an update operation within the snoop filter circuitry to update the address-dependent caching indication data to remove said inconsistency.

2. An interconnect as claimed in claim 1, wherein the snoop filter circuitry is arranged to maintain the address-dependent caching indication data in response to cache allocation information and cache eviction information issued by the plurality of master devices.

3. An interconnect as claimed in claim 2, wherein at least one of the master devices is arranged to perform at least one type of cache eviction operation in respect of its associated cache storage without passing corresponding cache eviction information to the coherency control circuitry.

4. An interconnect as claimed in claim 1, wherein the snoop filter circuitry comprises a snoop filter storage having a plurality of entries, each entry arranged to store an address identifier and the caching indication data for that address identifier.

5. An interconnect as claimed in claim 4, wherein:
the analysis circuitry is arranged to determine the update condition by detecting a situation where the snoop response data identifies that the associated cache storage of at least one master device no longer stores cached data for the target address, and the snoop control data for that target address indicates that said at least one master device did store the cached data; and the snoop filter circuitry is arranged to perform the update operation triggered by the update condition in order to update the address-dependent caching indication data for the entry whose address identifier corresponds to the target address.

6. An interconnect as claimed in claim 5, wherein when the snoop response data identifies that the cached data for the target address is no longer stored in the associated cache storage of any of said master devices, the snoop circuitry is arranged to perform the update operation in order to invalidate the corresponding entry in the snoop filter storage.

7. An interconnect as claimed in claim 5, wherein the analysis circuitry is arranged to detect the update condition by comparing a first vector derived from the snoop control data with a second vector derived from the snoop response data, both the first and second vectors having a field for each of the master devices, with each field being set or unset dependent on whether the snoop control data or snoop response data identifies the associated master device as storing the cached data in its associated cache storage.

8. An interconnect as claimed in claim 7, wherein:
the caching indication data in each entry of the snoop filter storage takes the form of a snoop vector identifying for each master device whether that master device has cached data associated with that address identifier; and
the snoop filter circuitry is arranged, on detection of the update condition in a situation where the second vector identifies at least one master device as still storing the cached data for the target address, to perform the update operation in order to update the snoop vector for the entry whose address identifier corresponds to the target address to match the second vector.

9. An interconnect as claimed in claim 4, wherein in each entry of the snoop filter storage the caching indication data includes a master identifier field identifying a master device, and a multiple field identifying whether one master device or multiple master devices store the cached data.

10. An interconnect as claimed in claim 9, wherein:
when the entry associated with the target address has the multiple field set the coherency control circuitry is arranged to issue the snoop transaction to all of the master devices;
the analysis circuitry is arranged to detect the update condition when the snoop response data indicates that only one master device still stores the cached data in its associated cache storage; and
the snoop filter circuitry is responsive to the update condition to unset the multiple field in the corresponding entry of the snoop filter to identify that one master device stores the cached data and to update the master identifier field to identify the one master device indicated by the snoop response data as still storing the cached data.

11. An interconnect as claimed in claim 10, wherein when the entry associated with the target address has the multiple field unset the coherency control circuitry is arranged to issue the snoop transaction to the master device identified in the master identifier field.

12. An interconnect as claimed in claim 4, wherein the address identifier identifies a unique address, and the caching indication data indicates which master devices have cached data for that unique address.

13. An interconnect as claimed in claim 4, wherein the address identifier identifies an address range, and the caching indication data indicates which master devices have cached data within that address range.

14. An interconnect as claimed in claim 4, wherein
the address identifier identifies an address range; and
the caching indication data provides a counter value for each master device indicating the number of allocations into the associated cache structure of cached data within that address range.

15. An interconnect as claimed in claim 14, wherein the snoop filter circuitry is arranged to adjust in a first direction the counter value for a master device each time the coherency control circuitry is advised that that master device has made a further allocation of cached data within that address range into its associated cache structure, and to adjust in a second direction the counter value for a master device each time the coherency control circuitry is advised that that master device has performed an eviction of cached data within that address range from its associated cache structure.

16. An interconnect as claimed in claim 14, wherein:
the snoop response data provides a further counter value for each master device identifying a number of cached entries in the associated cache storage currently storing cached data within the address range; and
the analysis circuitry is arranged to determine the update condition by detecting a situation where, for at least one of the master devices, the further counter value provided by the snoop response data differs from the counter value provided by the caching indication data.

17. An interconnect as claimed in claim 16, wherein the snoop circuitry is arranged to perform the update operation triggered by the update condition in order to update, for said at least one of the master devices, the counter value with the further counter value.

18. A method of managing a snoop filter for an interconnect connecting devices, the devices including a plurality of master devices, one or more of the master devices having associated cache storage, the method comprising:
performing coherency control operations for data access transactions received by the interconnect from the master devices;
maintaining within a snoop filter address-dependent caching indication data;
responsive to a data access transaction specifying a target address, deriving from the caching indication data snoop control data providing an indication of which master devices have cached data for the target address in their associated cache storage;
responsive to said snoop control data, issuing a snoop transaction to each master device indicated by the snoop control data, in order to cause a snoop operation to be performed in their associated cache storage in order to generate snoop response data; and
determining from the snoop response data an update condition where there is an inconsistency between the snoop response data and the snoop control data, and upon detection of said update condition triggering performance of an update operation within the snoop filter to update the address-dependent caching indication data to remove said inconsistency.

19. An interconnect for connecting devices, the devices including a plurality of master devices, one or more of the master devices having associated cache storage, the interconnect comprising:
coherency control means for performing coherency control operations for data access transactions received by the interconnect from the master devices;

snoop filter means for maintaining address-dependent caching indication data and, responsive to a data access transaction specifying a target address, for producing snoop control data providing an indication of which master devices have cached data for the target address in their associated cache storage;

the coherency control means, in response to said snoop control data, for issuing a snoop transaction to each master device indicated by the snoop control data, in order to cause a snoop operation to be performed in their associated cache storage in order to generate snoop response data; and analysis means for determining from the snoop response data an update condition where there is an inconsistency between the snoop response data and the snoop control data, and upon detection of said update condition, for triggering performance of an update operation within the snoop filter means to update the address-dependent caching indication data to remove said inconsistency.

* * * * *